No. 782,733. Patented February 14, 1905.

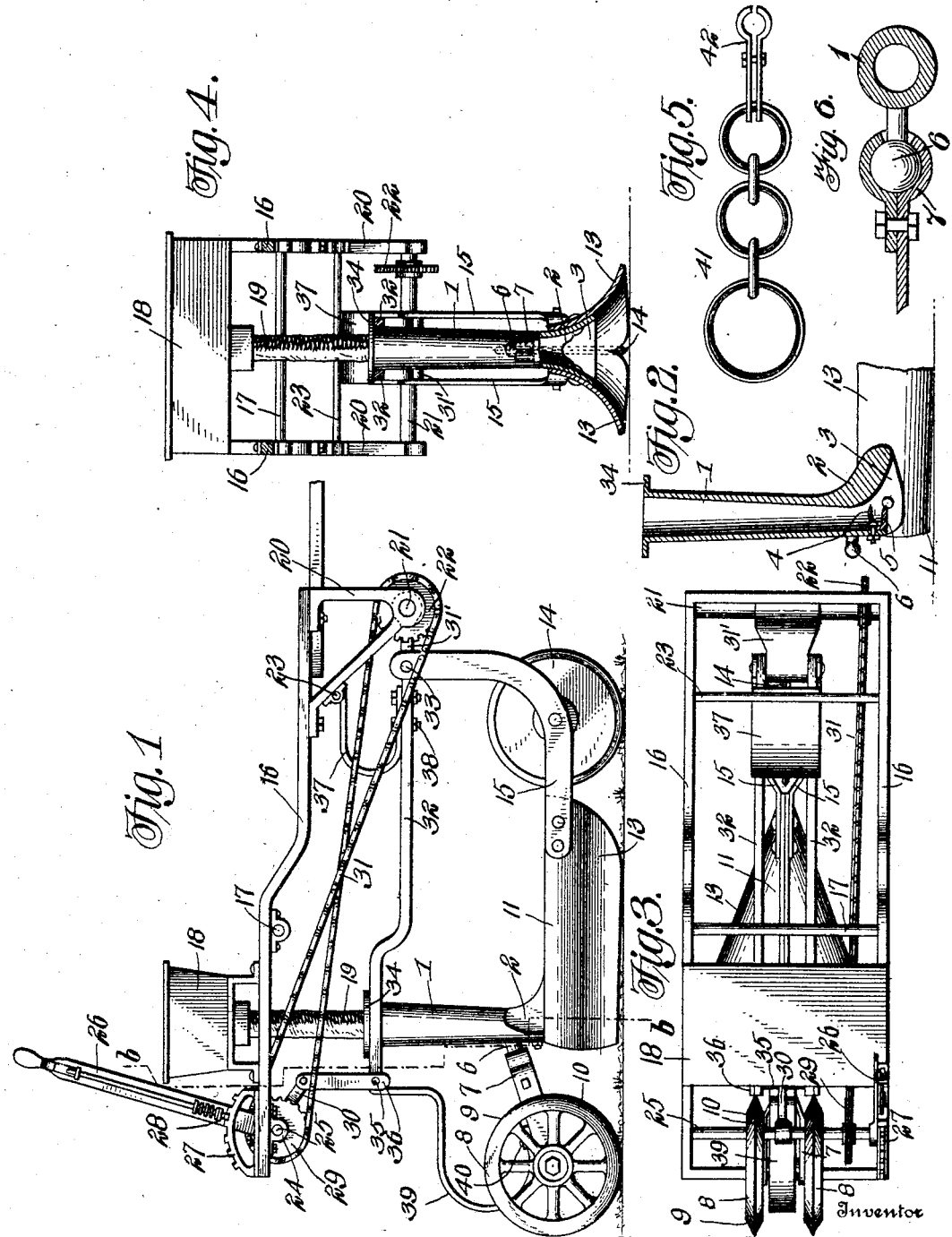

UNITED STATES PATENT OFFICE.

GILBERT O. ECKER, OF MYRAN, MINNESOTA.

GRAIN-DRILL.

SPECIFICATION forming part of Letters Patent No. 782,733, dated February 14, 1905.

Application filed May 13, 1904. Serial No. 207,743.

*To all whom it may concern:*

Be it known that I, GILBERT O. ECKER, a citizen of the United States, residing at Myran, in the county of Beltrami and State of Minnesota, have invented certain new and useful Improvements in Grain-Drills; and I do declare the following to be a full, clear, and exact description of the invention, such as will enable others skilled in the art to which it appertains to make and use the same.

My invention is an improved grain-drill adapted for depositing the seeds in drills of any desired depth, for scattering the seeds in the drills, and for covering the same; and it consists in the construction, combination, and arrangement of devices hereinafter described and claimed.

In the accompanying drawings, Figure 1 is a side elevation of a grain-drill embodying my improvements. Fig. 2 is a detail vertical sectional view of the same. Fig. 3 is a top plan view of the same. Fig. 4 is a transverse sectional view of the same. Fig. 5 is a detail view showing a seed-covering chain to be used in lieu of the covering-wheels, if desired. Fig. 6 is a sectional detail view showing the ball-and-socket connections between the drill-tube and the beam which trails the covering-wheel.

In the embodiment of my invention I provide a drill-tube 1, which is provided at its lower end with a foot 2, which extends laterally from opposite sides thereof and also projects forwardly therefrom and has its outer sides, which converge forwardly, hollowed or concaved, as at 3. The said foot is also concaved on its under side at its rear end, as at 4, the lower end of the grain-tube 1 communicating with the said concavity 4. Also formed with the foot or secured thereto by any suitable means is a scattering-plate 5, which is supported at a suitable distance below the lower end of the drill-tube and which is disposed below the concavity 4 of the foot. On the rear side of the drill-tube, near the lower end thereof, is a rearwardly-extending lug 6, to which is pivoted the front end of the rearwardly-extending beam 7. The latter is provided with suitable bearings having a pair of covering-wheels 8, which are of suitable size, are spaced apart a few inches, and have their peripheries 9 oppositely beveled, as at 10. It will be understood that these wheels 8 run on the bottom of the drill behind the drill-tube and serve to cover seeds deposited in the drill.

A drill-opening shoe 11 extends downwardly and forwardly from the lower end of the drill-tube and comprises a pair of oppositely-disposed wings or moldboards 13, the rear ends of which are secured on the sides of the foot and are concaved to correspond with the shape of the said sides. It will be understood that the lower edges of the wings or moldboards of the shoe diverge rearwardly and that the same are so shaped as to cause them to lift the soil so as to form a drill and to cause the soil to drop from each side back into the drill. Hence the seeds are dropped through the drill-tube into the drill and are covered, as will be understood. The plate 5, which is disposed directly under the bore of the drill-tube, serves to scatter the seeds in the drill. This plate is detachable and is secured in place by means of a bolt, as shown, which enables the plate to be removed when it is not desired to scatter the seeds in the drill.

To the front end of the shoe 11 are attached the rear ends of a pair of forwardly-extending upwardly-curved draft-irons 15, between which is mounted a colter 14, which is here shown as a revoluble disk. The said colter runs in the soil in advance of the shoe, prevents the latter from moving laterally, and serves to cut the soil in advance of the shoe to facilitate the operation of the latter in forming the drill. In Fig. 1 of the drawings the main frame of the machine is shown at 16, and the axle-shaft is indicated at 17. The seeding apparatus, which may be of any suitable construction, is indicated at 18 and is provided with the usual flexible discharge-tube 19, the lower end of which is disposed in the drill-tube 1. On the under side of the frame 16, at the front end thereof, are a pair of depending brackets 20 for each shoe appropriately spaced apart and which form the bearings for a shaft 21, which has a sprocket-wheel 22. A transversely-disposed rod 23 is secured to the said brackets near the rear ends thereof. At the rear end of the main frame 16 are bearings 24 for a shaft 25, which is a rock-shaft and to which is secured a hand-lever 26, whereby it may be turned. This hand-lever may be located at any desired adjustment by means of a segment-rack 27 and a locking-dog 28 of the usual construction. The said rock-shaft is provided also with a sprocket-wheel 29 and with a plurality of rock-arms 30, one of the said arms being provided for each shoe. A cross endless sprocket-chain 31 is here shown to connect the sprocket-wheels 22 29 together to cause the rock-shafts 21 24 to turn in unison in opposite directions.

Between the upper ends of the draft-irons of each shoe is pivoted a link-arm 31', the front end of which is pivotally mounted on the shaft 21. A pair of rods 32, which are appropriately spaced apart, are pivotally connected at their front ends to the draft-irons 15 by the pivots 33, which serve also to connect the draft-irons to the link-arm. The said rods 32 pass on opposite sides of the drill-tube and engage and bear under a flange-head 34, with which the drill-tube is provided. The rear ends of the said rods are connected together by a bolt 35, which serves for the pivotal attachment of the lower bifurcated end of a link 36 to the said rods, the upper end of the said link being pivotally connected to one arm 30 of the rock-shaft 24.

It will be understood that by turning the arm 26 the rock-shaft 24 may be correspondingly turned to raise or lower the rear ends of the rods 32, and hence raise or lower the rear end of the shoe. Since the rock-shaft 21 is connected to the rock-shaft 24 by the sprocket-wheels 22 29 and the crossed sprocket-chain 31, said rock-shaft 21 when the rock-shaft 24 is turned by the lever 26 will also turn simultaneously therewith in a reverse direction and raise or lower the front end of the shoe by means of the link-arms 31' to correspond with the vertical movement of the rear end of the shoe, so the latter will have both its front and rear ends raised or lowered simultaneously.

The link-arms 31' permit the front end of the shoe to be raised and lowered to some extent independently of the rear end thereof, the chain 31 being sufficiently slack for this purpose. To cause the front end of the shoe to be depressed and to be yieldable vertically, so that it may accommodate itself to inequalities in the surface of the soil, I provide in connection with each shoe a depressing-spring 37, which is here shown as a horizontally-disposed U-shaped spring having its upper arm bearing under the rod 23 and its lower arm connected, by means of bolts 38, to the rods 32 at a suitable distance from their front ends.

The connection 6 between the beam 7 and the drill-tube is a ball-and-socket joint, the ball being preferably formed as a rearwardly-extending lug of the drill-tube and the socket being formed at the front end of the beam 7, the latter comprising two members, as shown.

This connection between the beam of the covering-wheels and the drill-tube enables the covering-wheels to move freely both laterally and vertically independently of the drill-tube and shoe, to which it is attached.

It is of importance to press the covering-wheels downwardly to hold them to their work, and for this purpose I provide in connection with each shoe and its covering-wheel a depressing-spring 39, which may be either of the form here shown or of any other suitable form, its upper end being connected to the link 36 by the pivot-bolt 35 and its lower end being bolted to the beam 7, as at 40.

In some instances it may be desirable to dispense with the covering-wheels and employ in their stead a covering-chain 41, such as is shown in Fig. 5. The ball-and-socket joint thus enables this to be done, the covering-chain being provided with a socket member 42, as shown.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a machine of the class described, the combination with a machine-frame, of a shoe to open a drill having a draft-iron at its front end, a vertically-yieldable connection between the draft-iron and the frame, a spring to normally depress said draft-iron and also depress the front end of the shoe, means to raise and lower the front end of the shoe, and simultaneously-acting means to also raise and lower the rear end of the shoe, substantially as described.

2. In a machine of the class described, the combination with the machine-frame, of a drill-shoe and yieldable connection between the front end thereof and the frame, means to raise and lower the rear end of the shoe, means to raise and lower the front end of the shoe and means to yieldably depress the front end of the shoe, substantially as described.

3. In a machine of the class described, the combination with the machine-frame of a link pivotally connected thereto, a rod pivotally connected to the link and extending rearwardly therefrom, a shoe having a draft-iron at its front end pivotally connected to the link and rod, a connection between said rod and the rear portion of the shoe to raise and lower the latter with the rear end of the rod, means to raise and lower the rear end of the rod, and thereby raise and lower the rear end of the shoe, a spring exerting downward pressure on the front end of the shoe and means to raise and lower the front end of the shoe, substantially as described.

4. In a machine of the class described, the combination with the machine-frame, of a shoe to open a drill having a draft-iron at its front end, a rock-shaft carried by the frame, a link-arm connecting the rock-shaft to the draft-iron of the shoe, a rock-shaft, connections between the latter and the rear end of the shoe to raise and lower the rear end of the shoe, and a connection between the said rock-shafts to reversely and simultaneously turn them, for the purpose set forth, substantially as described.

5. In a machine of the class described, the combination with a machine-frame, of a drill-tube having a drill-shoe, the latter being provided with a forwardly and upwardly extending draft-iron, a vertically-yieldable connection between said draft-iron and the machine-frame, a spring to depress the draft-iron and, hence, also depress the front end of the shoe, means to raise and lower the drill-tube and the rear end of the shoe, a beam flexibly connected to the drill-tube and extending rearwardly therefrom, covering-wheels having their axles connected to the said beam and carried thereby, and a spring to depress the rear end of the said beam and, hence, also the said covering-wheels, said spring being connected to and vertically movable with the drill-tube.

In testimony whereof I have hereunto set my hand in presence of two subscribing witnesses.

GILBERT O. ECKER.

Witnesses:
 MARTIN RYAN,
 J. H. SELLECK.